United States Patent
Yamamoto et al.

(10) Patent No.: US 6,803,971 B2
(45) Date of Patent: Oct. 12, 2004

(54) PROJECTION TYPE VIDEO DISPLAY DEVICE THAT PREVENTS COLOR NONUNIFORMITY

(75) Inventors: Hideki Yamamoto, Kyoto (JP); Yoshihiro Sasaki, Osaka (JP); Hiroki Koba, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 465 days.

(21) Appl. No.: 09/953,203

(22) Filed: Sep. 17, 2001

(65) Prior Publication Data

US 2002/0033904 A1 Mar. 21, 2002

(30) Foreign Application Priority Data

Sep. 19, 2000 (JP) .................................. 2000-283206
Sep. 25, 2000 (JP) .................................. 2000-291151

(51) Int. Cl.[7] .................................................. H04N 5/74
(52) U.S. Cl. ........................................ 348/778; 348/745
(58) Field of Search ................................ 348/744, 750, 348/751, 758, 761, 766, 778–781; 359/629, 636, 638–640; 349/62–64, 68–70, 7, 8, 9; 353/81, 98

(56) References Cited

U.S. PATENT DOCUMENTS 5,900,982 A * 5/1999 Dolgoff et al. ............ 359/619
6,448,715 B1 * 9/2002 Fujiwara et al. .......... 315/129
6,636,274 B1 * 10/2003 Mazda et al. .............. 348/745

* cited by examiner

Primary Examiner—Victor R. Kostak
(74) Attorney, Agent, or Firm—Westerman, Hattori, Daniels & Adrian, LLP

(57) ABSTRACT

Two of four light sources have canceling characteristics with respect to color nonuniformity, and the other two light sources have canceling characteristics with respect to color nonuniformity. A light emission stop detector detects that each of the light sources stops emitting light by blowing its value for example, and feeds, if a certain light source stops emitting light, information indicating that the light source stops emitting light to an energization controller. The energization controller stops, when it receives the information indicating that a certain light source stops emitting light, the energization to a light source paired with the certain light source and puts out the light source.

7 Claims, 14 Drawing Sheets

| 32 | 32 | 32 | 32 | 32 | 32 | 32 | 32 | 32 | 32 | 32 | 32 | 32 | 32 | 32 | 32 |
|----|----|----|----|----|----|----|----|----|----|----|----|----|----|----|----|
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |

(b)

| 44 | 43 | 43 | 42 | 40 | 38 | 36 | 34 | 32 | 32 | 32 | 32 | 32 | 32 | 32 | 32 |
|----|----|----|----|----|----|----|----|----|----|----|----|----|----|----|----|
| 43 | 43 | 43 | 42 | 40 | 38 | 36 | 34 | 32 | 32 | 32 | 32 | 32 | 32 | 32 | 32 |
| 42 | 42 | 42 | 42 | 40 | 38 | 36 | 34 | 32 | 32 | 32 | 32 | 32 | 32 | 32 | 32 |
| 40 | 40 | 40 | 40 | 40 | 38 | 36 | 34 | 32 | 32 | 32 | 32 | 32 | 32 | 32 | 32 |
| 38 | 38 | 38 | 38 | 38 | 38 | 36 | 34 | 32 | 32 | 32 | 32 | 32 | 32 | 32 | 32 |
| 36 | 36 | 36 | 36 | 36 | 36 | 36 | 34 | 32 | 32 | 32 | 32 | 32 | 32 | 32 | 32 |
| 34 | 34 | 34 | 34 | 34 | 34 | 34 | 34 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |

(c)

| 34 | 34 | 34 | 34 | 34 | 34 | 34 | 34 | 34 | 34 | 34 | 34 | 34 | 34 | 34 | 34 |
|----|----|----|----|----|----|----|----|----|----|----|----|----|----|----|----|
| 34 | 34 | 34 | 34 | 34 | 34 | 34 | 34 | 34 | 34 | 34 | 34 | 34 | 34 | 34 | 34 |
| 34 | 34 | 34 | 34 | 34 | 34 | 34 | 34 | 34 | 34 | 34 | 34 | 34 | 34 | 34 | 34 |
| 34 | 34 | 34 | 34 | 34 | 34 | 34 | 34 | 34 | 34 | 34 | 34 | 34 | 34 | 34 | 34 |
| 34 | 34 | 34 | 34 | 34 | 34 | 34 | 34 | 34 | 34 | 34 | 34 | 34 | 34 | 34 | 34 |
| 34 | 34 | 34 | 34 | 34 | 34 | 34 | 34 | 34 | 34 | 34 | 34 | 34 | 34 | 34 | 34 |
| 34 | 34 | 34 | 34 | 34 | 34 | 34 | 34 | 34 | 34 | 34 | 34 | 34 | 34 | 34 | 34 |
| 34 | 34 | 34 | 34 | 34 | 34 | 34 | 34 | 34 | 34 | 34 | 34 | 34 | 34 | 34 | 34 |
| 34 | 34 | 34 | 34 | 34 | 34 | 34 | 34 | 34 | 34 | 34 | 34 | 34 | 34 | 34 | 34 |
| 34 | 34 | 34 | 34 | 34 | 34 | 34 | 34 | 34 | 34 | 34 | 34 | 34 | 34 | 34 | 34 |
| 34 | 34 | 34 | 34 | 34 | 34 | 34 | 34 | 34 | 34 | 34 | 34 | 34 | 34 | 34 | 34 |
| 34 | 34 | 34 | 34 | 34 | 34 | 34 | 34 | 34 | 34 | 34 | 34 | 34 | 34 | 34 | 34 |
| 34 | 34 | 34 | 34 | 34 | 34 | 34 | 34 | 34 | 34 | 34 | 34 | 34 | 34 | 34 | 34 |
| 34 | 34 | 34 | 34 | 34 | 34 | 34 | 34 | 34 | 34 | 34 | 34 | 34 | 34 | 34 | 34 |
| 34 | 34 | 34 | 34 | 34 | 34 | 34 | 34 | 34 | 34 | 34 | 34 | 34 | 34 | 34 | 34 |
| 34 | 34 | 34 | 34 | 34 | 34 | 34 | 34 | 34 | 34 | 34 | 34 | 34 | 34 | 34 | 34 |

PROJECTION TYPE VIDEO DISPLAY DEVICE THAT PREVENTS COLOR NONUNIFORMITY

BACKGROUND OF THE INVENTION

FIELD OF THE INVENTION

The present invention relates to a projection type video display device having a plurality of light sources. FIG. 7 is a plan view showing an optical system in a four-light and triple-plate liquid crystal projector. An illuminating device 1 comprises two light sources 1a and 1b arranged opposite to each other and two light sources 1c and 1d similarly arranged opposite to each other, an optical path changing member 2 arranged between the light sources 1a and 1b, and an optical path changing member 3 arranged between the light sources 1c and 1d. The light sources 1a and 1b are shifted upward, as shown in FIG. 8(a), with respect to the light sources 1c and 1d. Each of the light sources is composed of an extra-high pressure mercury lamp, a metal halide lamp, a xenon lamp, or the like, and light irradiated by the light source is emitted after being changed into parallel light by a parabola reflector, and is introduced into an integrator lens 4. The integrator lens 4 comprises a pair of groups of lenses, and each lens portion introduces the light emitted from each of the light sources 1a, 1b, 1c, and 1d into the whole surface of a liquid crystal light valve, described later. A state where the light from each of the light sources is incident on the integrator lens 4 is as illustrated in FIG. 8(b). The light which has passed through the integrator lens 4 is introduced into a first dichroic mirror 7 after passing through a polarized light converter 5 and a condenser lens 6.

The first dichroic mirror 7 transmits light in a red wavelength band, while reflecting light in a cyan (green+blue) wavelength band. The light in the red wavelength band which has passed through the first dichroic mirror 7 is reflected on a reflecting mirror 9 through a concave lens 8 so that its optical path is changed. The red light which has been reflected on the reflecting mirror 9 is optically modulated by passing through a light transmission-type liquid crystal light valve for red 31 through a lens 10. On the other hand, the light in the cyan wavelength band which has been reflected on the first dichroic mirror 7 is introduced into a second dichroic mirror 12 through a concave lens 11.

The second dichroic mirror 12 transmits light in a blue wavelength band, while reflecting light in a green wavelength band. The light in the green wavelength band which has been reflected on the second dichroic mirror 12 is introduced into a light transmission-type liquid crystal light valve for green 32 through a lens 13 and is optically modulated by passing through the liquid crystal light valve 32. The light in the blue wavelength band which has passed through the second dichroic mirror 12 is introduced into a light transmission-type liquid crystal light valve for blue 33 through a relay lens 14, a total reflecting mirror 15, a relay lens 16, a total reflecting mirror 17, and a relay lens 18, and is modulated by passing through the liquid crystal light valve 33.

Modulated light beams (video light beams in respective colors) which have been modulated by passing through the liquid crystal light bulbs 31, 32, 33 are synthesized by a dichroic prism 19, to obtain color video light. The color video light is projected in enlarged fashion by a projection lens 20, and is projected and displayed on a screen 21.

Meanwhile, the first dichroic mirror 7 has the property of transmitting a wavelength larger than a certain wavelength and reflecting a wavelength shorter than the certain wavelength. However, a wavelength having a transmission rate of 50% (a half wavelength) varies depending on an angle of incidence, as shown in FIGS. 9(a) and 9(b). That is, one of an angle at which light from the light sources 1a and 1c is incident on the first dichroic mirror 7 and an angle at which light from the light sources 1b and 1d is incident on the first dichroic mirror 7 is represented by a symbol C in FIG. 9, and the other thereof is represented by a symbol B. Consequently, a difference occurs between a color component in a case where the light from the light sources 1a and 1c passes through the first dichroic mirror 7 and a color component in a case where the light from the light sources 1b and 1d passes through the first dichroic mirror 7.

Furthermore, as shown in FIGS. 10(a) and 10(b), the light transmission rate of each of the liquid crystal light bulbs 31, 32, and 33 varies depending on the angle of incidence of light. Light from a certain light source enters a certain liquid crystal light bulb leftward from the right, while entering a certain liquid crystal light valve rightward from the left. Further, light from a certain light source enters a certain liquid crystal light valve downward from the top, while entering the liquid crystal light valve 33 upward from the bottom by passing through the relay lenses 14 and 16 and the relay lens 18. The direction in which light enters a liquid crystal light valve may be reversed. That is, light entering a certain liquid crystal light valve from a certain light source is represented by a symbol C in FIG. 10, while light entering a certain liquid crystal light valve from a certain light source is represented by a symbol B.

FIGS. 11 and 12 illustrate a state where a chromaticity coordinate y in a case where only one of the light sources is put on is changed in the horizontal direction at the center of projected video, where FIG. 11(a) is a characteristic view at the time when the light source 1a is put on, FIG. 11(b) is a characteristic view at the time when the light source 1b is put on, FIG. 12(a) is a characteristic view at the time when the light source 1c is put on, and FIG. 12(b) is a characteristic view at the time when the light source 1d is put on. As apparent from the drawings, color nonuniformity and a change in white color temperature occur in putting on only one of the light sources. This is caused by a phenomenon described in FIGS. 9 and 10. On the other hand, in a state where all the four light sources 1a, 1b, 1c, and 1d are put on, the color nonuniformity is canceled by canceling the characteristics of the light sources. Accordingly, the value of Y is made constant, as shown in FIG. 13, so that the color nonuniformity is canceled, and an objective color temperature is obtained in the white color temperature.

In a state where all the four light sources 1a, 1b, 1c, and 1d are put on, as shown in FIG. 14(a) however, the color nonuniformity is canceled by canceling the characteristics, as described above. On the other hand, in a case where one of the light sources (the light source 1a in the drawing) stops emitting light by blowing its bulb, for example, as shown in FIG. 14(b) the canceling state is changed, causing color nonuniformity. From the same reason, a white color temperature is changed. It goes without saying that even in a case where two or more of the light sources stop emitting light, the canceled state may be changed, causing color nonuniformity and a change in white color temperature.

The present invention has been made in view of the above-mentioned circumstances, and has for its object to provide a projection type video display device capable of restraining, in a case where it has a plurality of light sources, the occurrence of color nonuniformity and the change in white color temperature even when one or more of the light sources stop emitting light.

SUMMARY OF THE INVENTION

In order to solve the above-mentioned problem, a projection type video display device according to the present invention is characterized by comprising an illumination optical system having a plurality of light sources for introducing light emitted from each of the light sources toward a partial area of an integrator lens to irradiate the whole area of the integrator lens; a color separation optical system for separating the light which has passed through the integrator lens into a plurality of color light beams; a light valve for modulating each of the color light beams; a projection optical system for projecting the light beam modulated by the light bulb; a detector for detecting that the light source stops emitting light; and a lights-out controller for putting out, when one of the pair of light sources having canceling characteristics with respect to color nonuniformity stops emitting light, the other light source.

According to the above-mentioned configuration, in a case where the projection type video display device has two pairs of light sources (a total of four light sources) having canceling characteristics with respect to color nonuniformity, for example, when one of the light sources stops emitting light, the detector detects that the light source stops emitting light. Accordingly, the other light source paired with the one light source is put out by the lights-out controller, so that the illuminated state is maintained in the other pair of light sources (two light sources) having canceling characteristics with respect to color nonuniformity. Therefore, the brightness is decreased, while the color nonuniformity is prevented from occurring.

A projection type video display device according to the present invention is characterized by comprising an illumination optical system having a plurality of light sources for introducing light emitted from each of the light sources toward a partial area of an integrator lens to irradiate the whole area of the integrator lens; a color separation optical system for separating the light which has passed through the integrator lens into a plurality of color light beams; a light valve for modulating each of the color light beams; a projection optical system for projecting the light beam modulated by the light bulb; a detector for detecting that the light source stops emitting light; and reporting means for urging, when one of the pair of light sources having canceling characteristics with respect to color nonuniformity stops emitting light, a user to put out the other light source.

According to the above-mentioned configuration, in a case where the projection type video display device has two pairs of light sources (a total of four light sources) having canceling characteristics with respect to color nonuniformity, for example, when one of the light sources stops emitting light, the detector detects that the light source stops emitting light, to urge the user to put out the other light source paired with the one light source. When the user puts out the other light source, therefore, the illuminated state is maintained in the other pair of light sources (two light sources) having canceling characteristics with respect to color nonuniformity. Therefore, the brightness is decreased, while the color nonuniformity is prevented from occurring.

A projection type video display device according to the present invention is characterized by comprising an illumination optical system having a plurality of light sources for introducing light emitted from each of the light sources toward a partial area of an integrator lens to irradiate the whole area of the integrator lens; a color separation optical system for separating the light which has passed through the integrator lens into a plurality of color light beams; a light valve for modulating each of the color light beams; a projection optical system for projecting the light beam modulated by the light bulb; a switch for selecting the lights-up/lights-out of the light source; and a controller for putting on/out both the pair of light sources having canceling characteristics with respect to color nonuniformity when the switch is operated.

According to the above-mentioned configuration, in a case where the projection type video display device has two pairs of light sources (a total of four light sources) having canceling characteristics with respect to color nonuniformity, for example, when the lights-out is selected by the switch, the one pair out of the two pairs of light sources is put out, thereby entering a power saved state where the brightness is decreased while preventing the color nonuniformity from occurring.

A projection type video display device according to the present invention is characterized by comprising an illumination optical system having a plurality of light sources for introducing light emitted from each of the light sources toward a partial area of an integrator lens to irradiate the whole area of the integrator lens; a color separation optical system for separating the light which has passed through the integrator lens into a plurality of color light beams; a light valve for modulating each of the color light beams; a projection optical system for projecting the light beam modulated by the light bulb; a correction data memory storing correction data previously prepared in order to cancel each of color nonuniformities which occur when any one or more of the light sources stop emitting light; a detector for detecting that the light source stops emitting light; and a video signal corrector for reading out the correction data depending on the light source which stops emitting light and correcting a video signal.

According to the above-mentioned configuration, the detector detects, when the light source stops emitting light, which of the light sources stops emitting light, the correction data previously prepared is read out as a case where the light source stops emitting light, and the video signal is corrected on the basis of the correction data. Accordingly, the color nonuniformity is restrained.

A projection type video display device according to the present invention is characterized by comprising an illumination optical system having a plurality of light sources for introducing light emitted from each of the light sources toward a partial area of an integrator lens to irradiate the whole area of the integrator lens; a color separation optical system for separating the light which has passed through the integrator lens into a plurality of color light beams; a light valve for modulating each of the color light beams; a projection optical system for projecting the light beam modulated by the light bulb; a correction data memory storing correction data previously prepared in order to cancel a change in white color temperature which occurs when any one or more of the light sources stop emitting light; a detector for detecting that the light source stops emitting light; and a video signal corrector for reading out the correction data depending on the light source which stops emitting light and correcting a video signal.

According to the above-mentioned configuration, the detector detects, when the light source stops emitting light, which of the light sources stops emitting light, the correction data previously prepared is read out as a case where the light source stops emitting light, and the video signal is corrected on the basis of the correction data. Accordingly, the change in white color temperature is restrained.

The projection type video display device may further comprise a lights-out controller for putting out any one or more of the light sources, and may be so constructed as to perform correction for canceling the color nonuniformity or correction for canceling the change in white color temperature by the video signal corrector when the light source is put out. Consequently, it is possible to reduce the number of light sources which are put on to enter an energy saving state as well as to restrain the color nonuniformity and the change in white color temperature which occur because all the light sources are not put on by the correction processing.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6(a), 6(b), and 6(c) are illustrations respectively showing correction data;

FIG. 11(a) is a characteristic view in a case where only a light source 1a is put on;

FIG. 11(b) is a characteristic view in a case where only a light source 1b is put on;

FIG. 12(a) is a characteristic view in a case where only a light source 1c is put on;

FIG. 12(b) is a characteristic view in a case where only a light source 1d is put on;

FIG. 13 is a characteristic view in a case where all light sources are put on;

FIG. 14(a) is an illustration showing a state where all light sources are put on.

DESCRIPTION OF THE EMBODIMENTS

Embodiment 1

Figure 2:
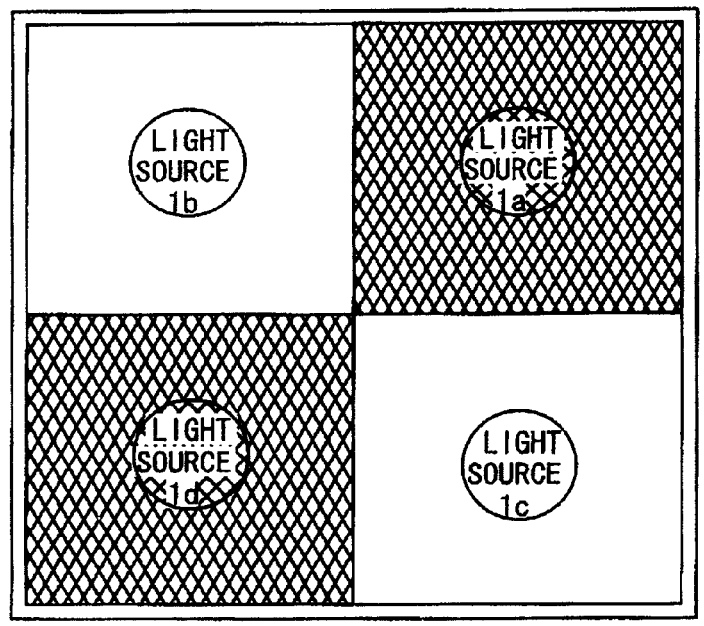
FIGS. 2(a) and 2(b) are illustrations respectively showing an example of lights-up control in a four-light configuration shown in FIG. 1.
Figure 2:
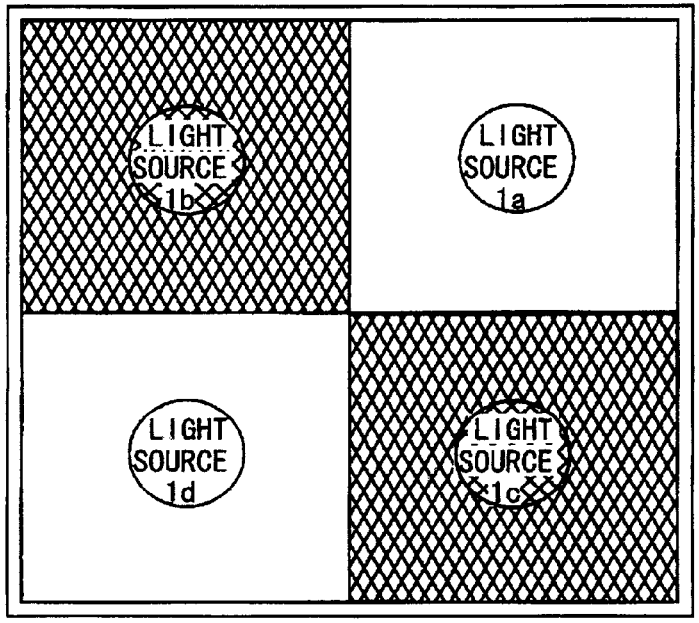
Figure 3:
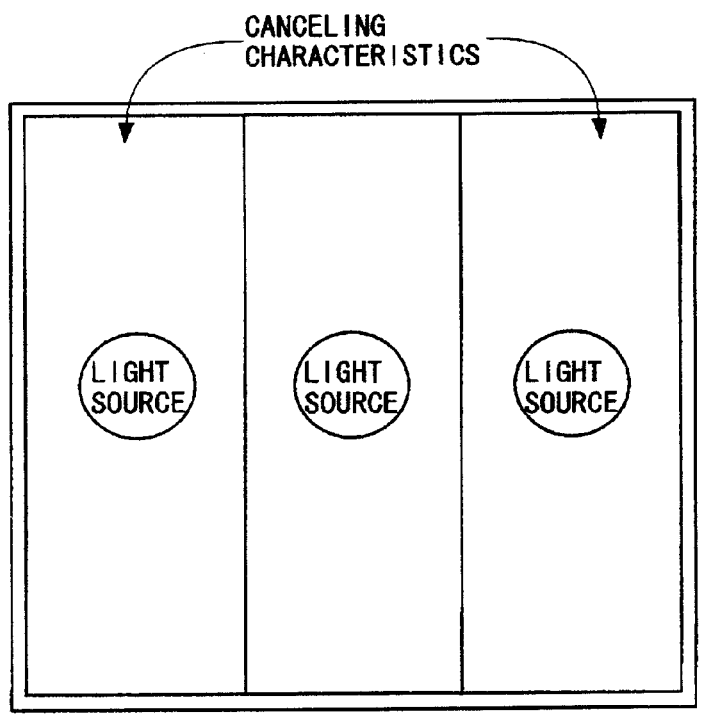
FIGS. 3(a) and 3(b) are illustrations respectively showing an example of lights-up control in another multiple-light configuration.
Figure 3:
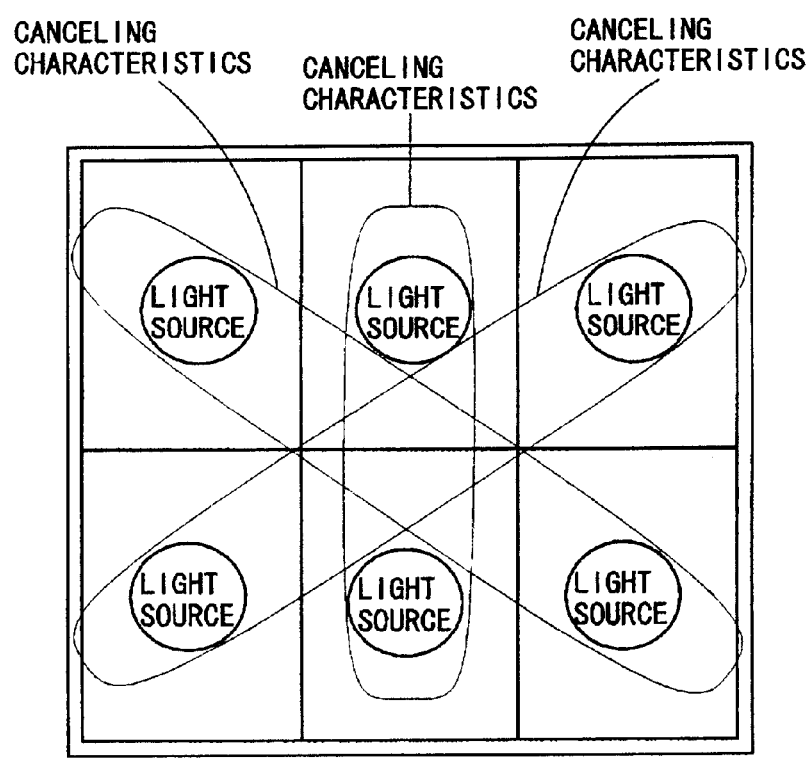

A liquid crystal projector in a first embodiment of the present invention will be described on the basis of FIGS. 1 to 3. For convenience of illustration, the same members as the optical members appearing on the drawings used in the prior art are assigned the same reference numerals, and are described by citing the drawings (FIGS. 8(a), 8(b), 11(a), 11(b), 12(a), and 12(b)) used in the prior art.

Figure 1:
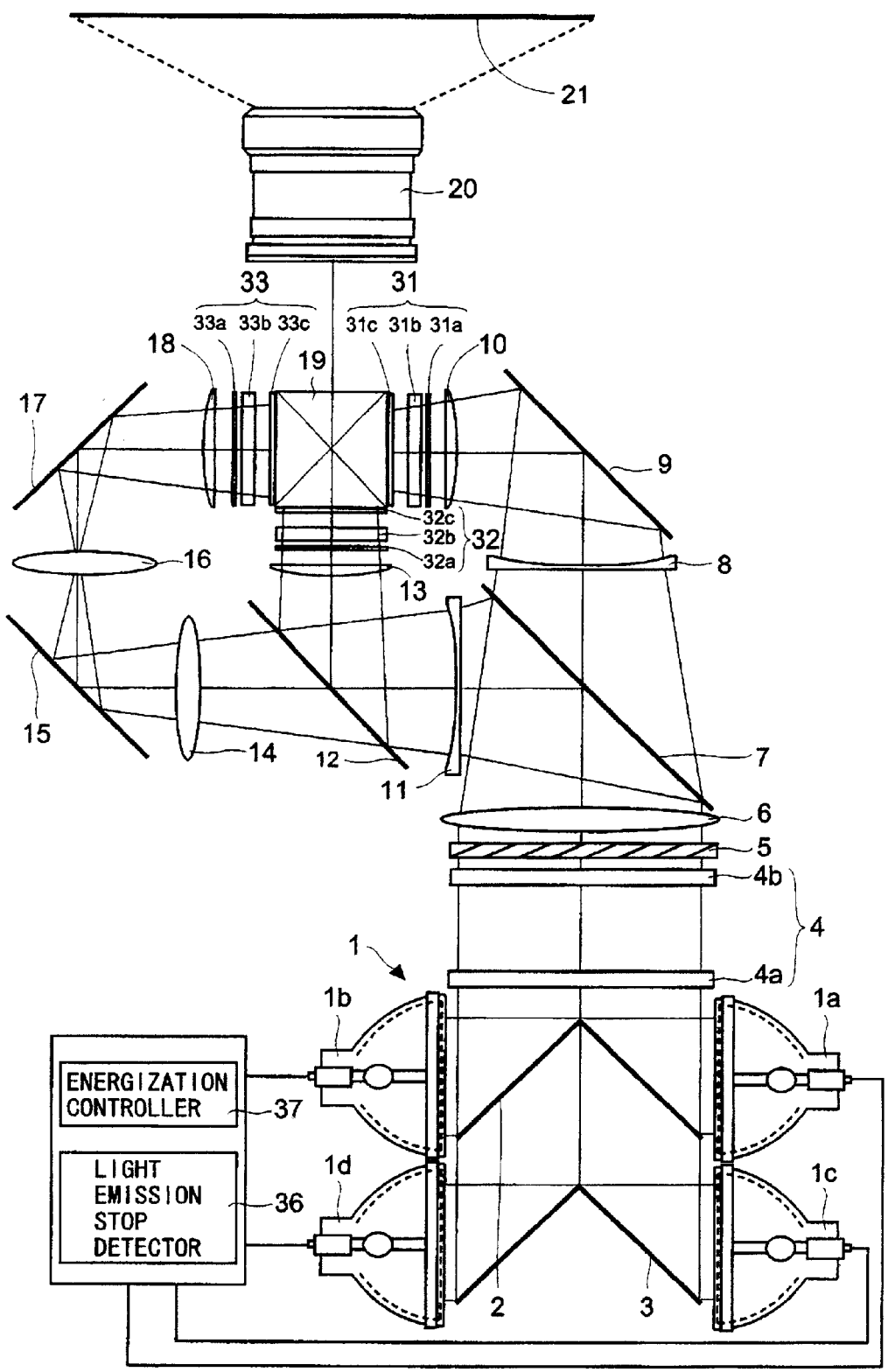
FIG. 1 is an illustration showing an optical system and a lights-up system in a four-light and triple-plate liquid crystal projector in an embodiment 1 of the present invention.
Figure 8A:
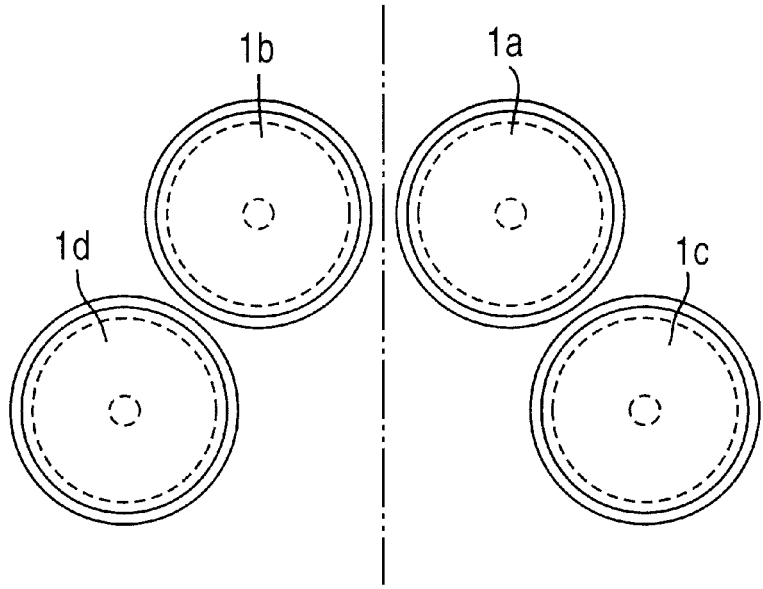
FIGS. 8(a) and 8(b) are illustrations showing an arrangement relationship or the like of light sources.

FIG. 1 is a diagram showing an optical system and a lights-up control system in a four-light and triple-plate liquid crystal projector according to the present embodiment 1. An illuminating device 1 comprises two light sources 1a and 1b arranged opposite to each other and two light sources 1c and 1d similarly arranged opposite to each other, an optical path changing member 2 arranged between the light sources 1a and 1b, and an optical path changing member 3 arranged between the light sources 1c and 1d. The light sources 1a, 1b, 1c, and 1d respectively have characteristics shown in FIGS. 11(a) and 11(b) and FIGS. 12(a) and 12(b). The light sources 1a and 1b are shifted upward, as shown in FIG. 8(a), with respect to the light sources 1c and 1d. Each of the light sources is composed of an extra-high pressure mercury lamp, a metal halide lamp, a xenon Lamp, or the like, and light irradiated by the light source is emitted after being changed into parallel light by a parabolic reflector, and is introduced into an integrator lens 4.

Figure 8B:
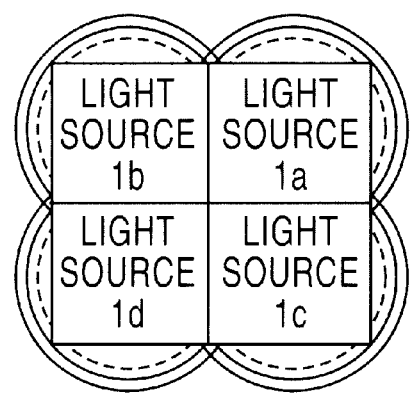
Figure 9A:
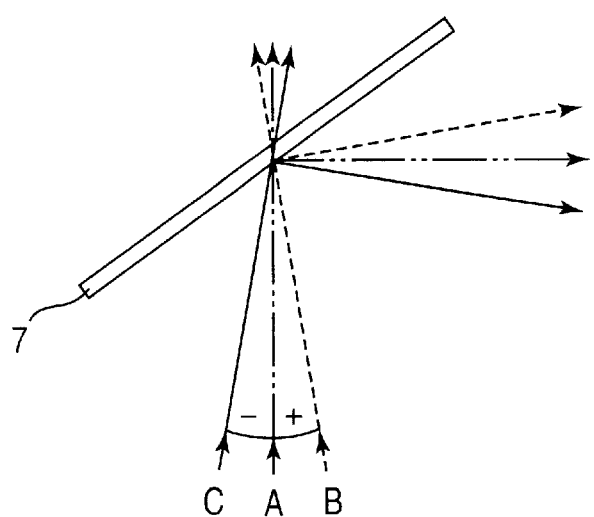
FIG. 9(a) is an illustration showing the difference in an angle of incidence of light from a light source on a dichroic mirror.
Figure 9B:
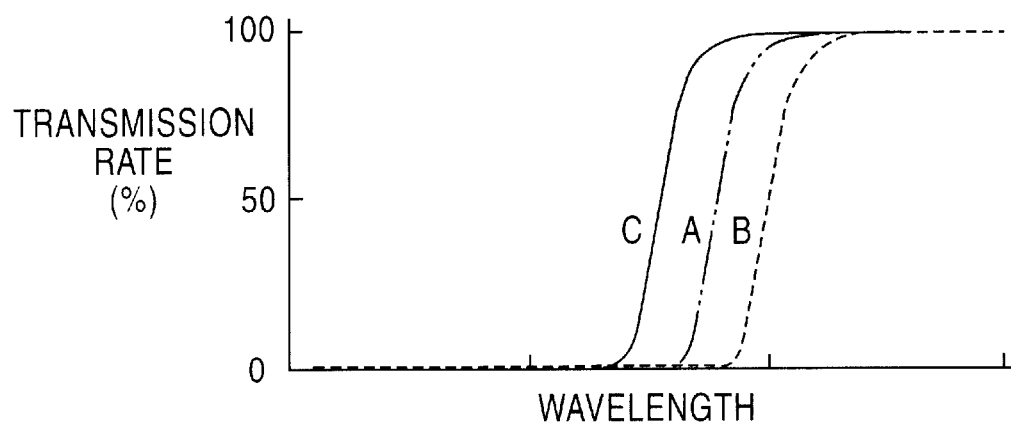
FIG. 9(b) is a graph showing the change in light transmission characteristics depending on the difference in an angle of incidence.
Figure 10A:
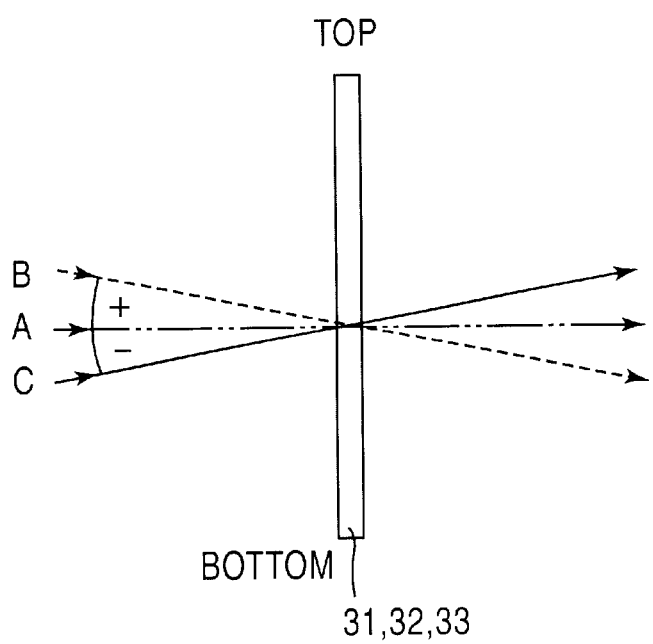
FIG. 10(a) is an illustration showing the difference in an angle of incidence of light from a light source on a liquid crystal light bulb.
Figure 10B:
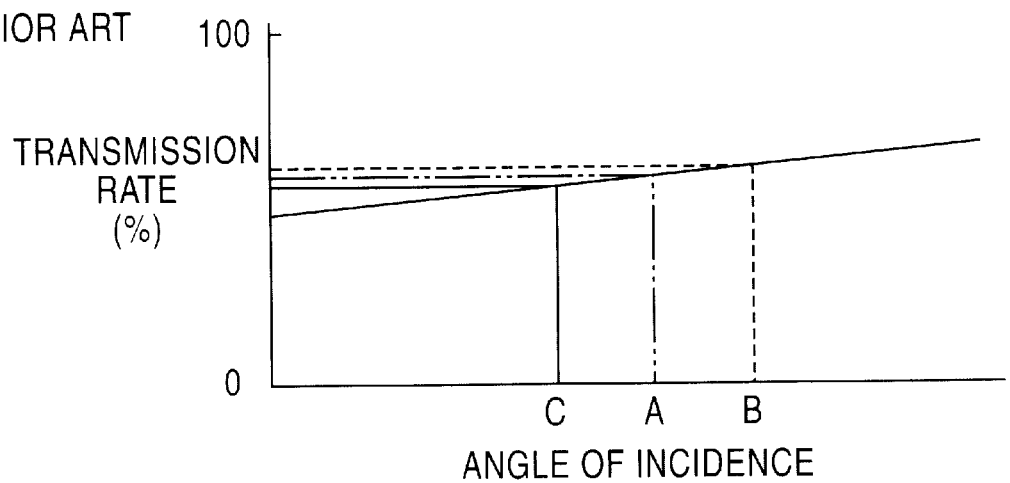
FIG. 10(b) is a graph showing the change in light transmission characteristics depending on the difference in an angle of incidence.

The integrator lens 4 comprises a pair of groups of lenses, and each lens portion introduces the light emitted from each of the light sources 1a, 1b, 1c, and 1d into the whole surface of a liquid crystal light valve, described later. A state where the light from each of the light sources is incident on the integrator lens 4 is as illustrated in FIG. 8(b). The light which has passed through the integrator lens 4 is introduced into a first dichroic mirror 7 after passing through a polarized light converter 5 and a condenser lens 6.

The polarized light converter 5 comprises a plurality of polarized light beam splitter arrays (hereinafter referred to as PBS arrays). The PBS array comprises a reflecting film, a polarized light separating film, and a phase difference plate (½ λ plate) (none of them are illustrated). The polarized light separating film is positioned in correspondence with the center of the group of lenses 4b in the integrator lens 4. The PBS arrays pass P polarized light beams, for example, of the light from the integrator lens 4, changes the optical path of S polarized light beams by 90°, and reflects and emits the S polarized light beams on the reflecting film. The P polarized light beams which have passed through the PBS arrays are converted into S polarized light beams by the phase difference plate provided ahead thereof (on the side of light emission) and the S polarized light beams are emitted. That is, almost all of the light beams are converted into S polarized light beams.

The first dichroic mirror 7 transmits light in a red wavelength band, while reflecting light in a cyan (green+blue) wavelength band. The light in the red wavelength band which has passed through the first dichroic mirror 7 is reflected on a reflecting mirror 9 through a convex lens 8 so that its optical path is changed. The red light which has been reflected on the reflecting mirror 9 is optically modulated by passing through a light transmission-type liquid crystal light valve for red 31 through a lens 10. On the other hand, the light in the cyan wavelength band which has been reflected on the first dichroic mirror 7 is introduced into a second dichroic mirror 12 through a convex lens 11.

The second dichroic mirror 12 transmits light in a blue wavelength band, while reflecting light in a green wavelength band. The light in the green wavelength band which has been reflected on the second dichroic mirror 12 is introduced into a light transmission-type liquid crystal light valve for green 32 through a lens 13 and is optically modulated by passing through the liquid crystal light valve 32. The light in the blue wavelength band which has passed through the second dichroic mirror 12 is introduced into a light transmission-type liquid crystal light valve for blue 33 through a relay lens 14, a total reflecting mirror 15, a relay lens 16, a reflecting mirror 17, and a relay lens 18, and is optically modulated by passing through the liquid crystal light valve 33.

The liquid crystal light bulbs 31, 32, and 33 respectively comprise incidence-side polarizing plates 31a, 32a, and 33a, panels 31b, 32b, and 33b each constructed by sealing a liquid crystal between a pair of glass boards (where a pixel electrode or an orientation film is formed), and emission-side polarizing plates 31c, 32c, and 33c. The incidence-side polarizing plates 31a, 32a, and 33a absorb P polarized light beams and transmit S polarized light beams in the present embodiment.

Modulated light beams (video light beams in respective colors) which have been modulated by passing through the liquid crystal light bulbs 31, 32, and 33 are synthesized by a dichroic prism 19, to obtain color video light. The color video light is projected in enlarged fashion by a projecting lens 20, and is projected and displayed on a screen 21.

A light emission stop detector 36 monitors the power consumed state of each of the light sources 1a, 1b, 1c, and 1d, for example. Power is not consumed when the light source stops emitting light by blowing its valve or breaking its wire, for example. Accordingly, the light emission stop detector 36 detects that each of the light sources stops emitting light on the basis of the fact that power is not consumed. An energization controller 37 is so constructed as to supply power to the light sources 1a, 1b, 1c, and 1d individually or in combination of the light sources 1a and 1d and the light sources 1b and 1c, and carries out power supply stop control (lights-out control) on the basis of detection information related to the stop of light emission from the light emission stop detector 36. Specifically, when either one of the light source 1a and the light source 1d stops emitting light, as shown in FIG. 2(a), the supply of power to the other light source (1d or 1a) is stopped (the light source is put out). On the other hand, when either one of the light source 1b and the light source 1c stops emitting light, as shown in FIG. 2(b), the supply of power to the other light source (1c or 1b) is stopped (the light source is put out).

Figure 11A:
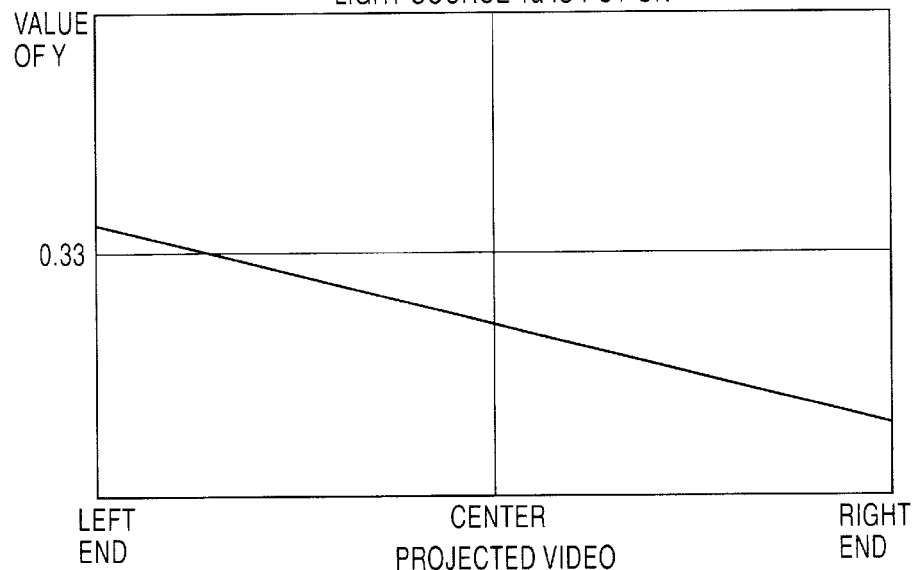
Figure 11B:
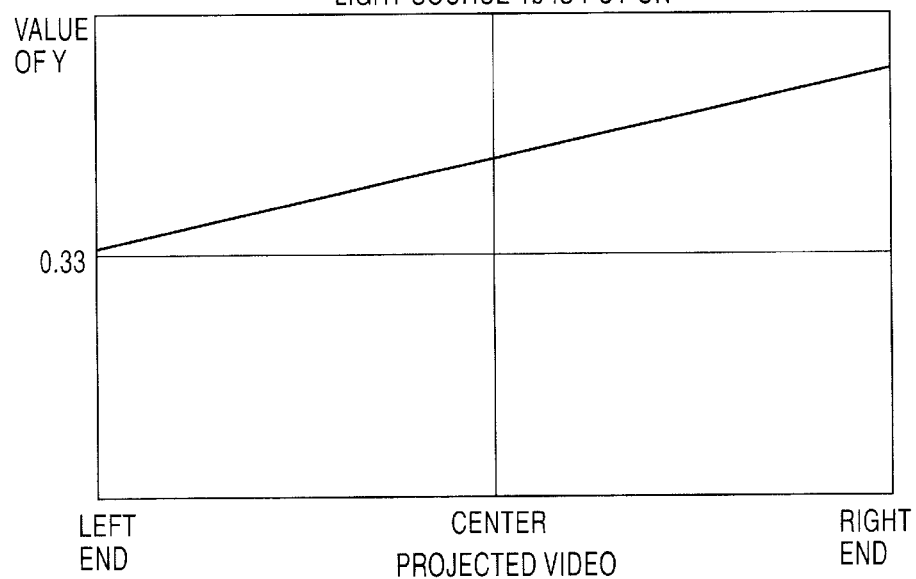
Figure 12A:
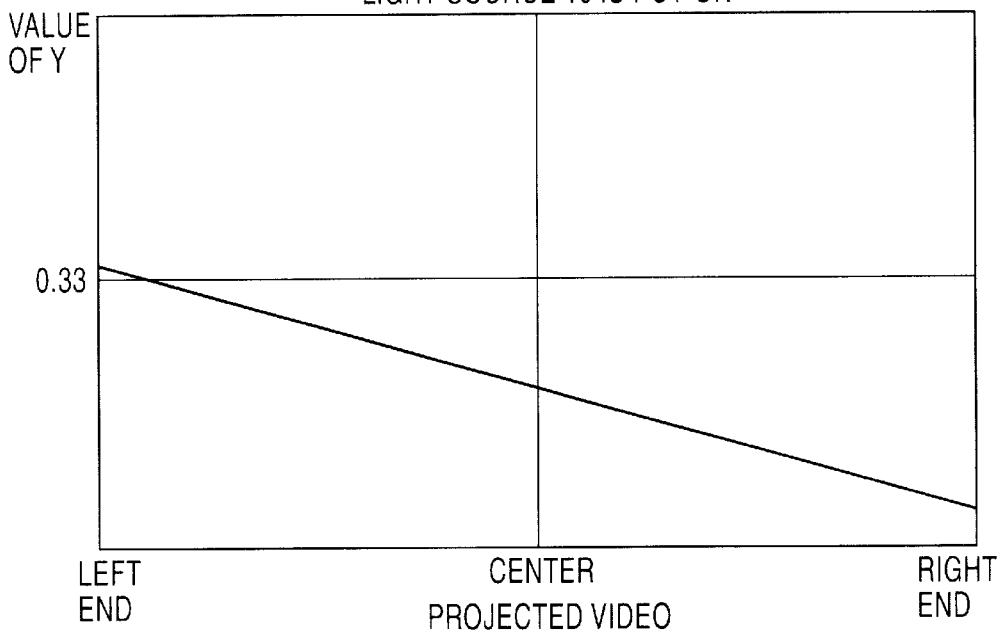
Figure 12B:
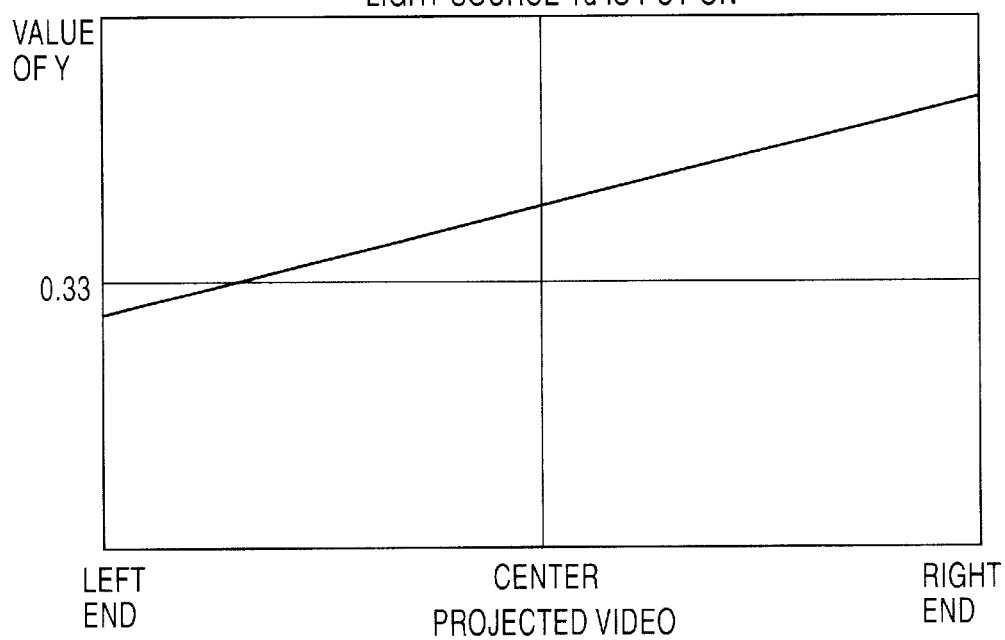
Figure 13:
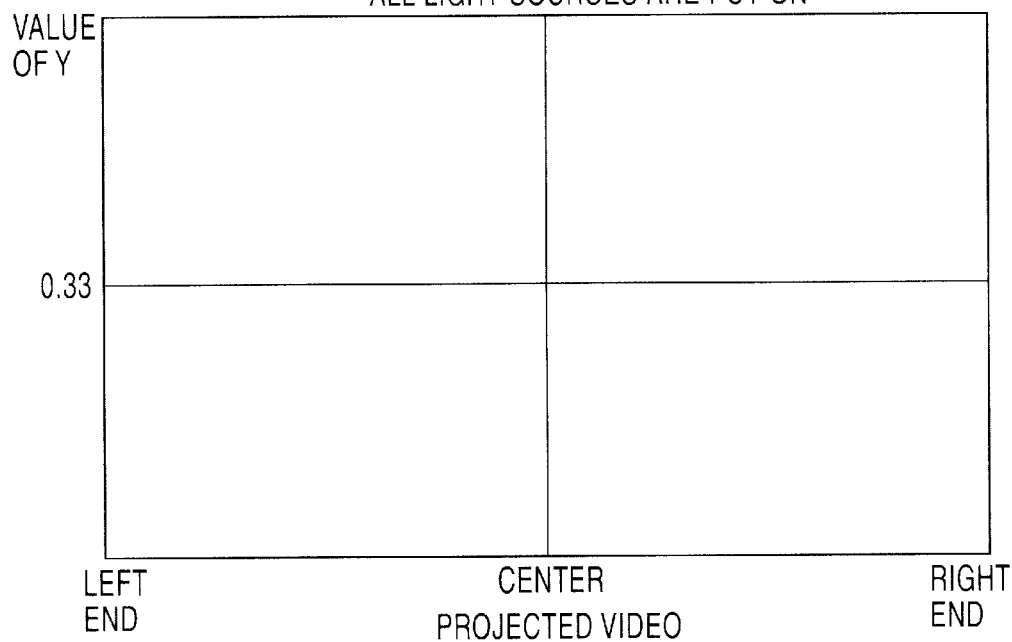
Figure 14A:
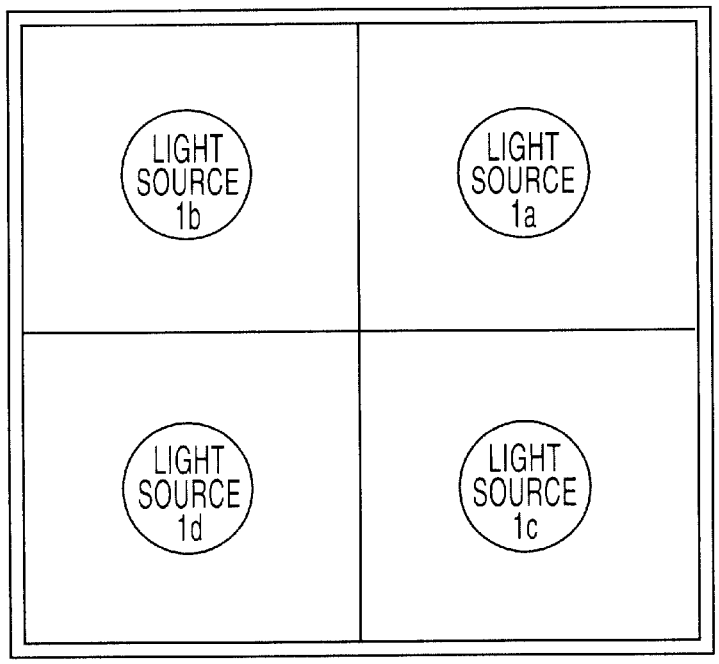
Figure 14B:
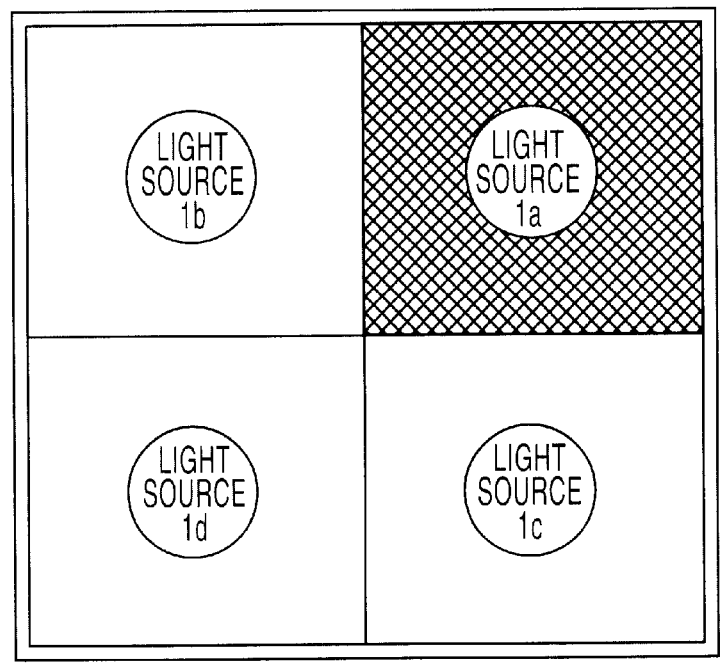
FIG. 14(b) is an illustration showing a state where a light source 1a stops emitting light.

The light source 1a and the light source 1d have canceling characteristics with respect to color nonuniformity each other, as shown in FIGS. 11(a) and 12(b), and the light source 1b and the light source 1c have canceling characteristics with respect to color nonuniformity each other, as shown in FIGS. 11(b) and 12(a). Accordingly, the color nonuniformity is canceled by the above-mentioned lights-out control. With respect to the other pair of light sources (two light sources) having canceling characteristics with respect to the color nonuniformity, the illuminated state is maintained. Accordingly, the brightness is decreased, while video projection can be continued.

Although in the above-mentioned example, the light source is automatically put out when it stops emitting light. When the light source stops emitting light, however, a user may be urged to suitably perform a lights-out operation. For example, switches capable of respectively operating ON/OFF of the light sources are provided, and a light emitter (an LED (Light-Emitting Diode), etc.) is arranged in the vicinity of each of the switches. When the light emission stop detector 36 detects that a certain light source stops emitting light, it may be reported to the user by putting on the light emitter (causing the light emitter to flicker) which of the switches is for operating the other light source to be put out. It goes without saying that the number or the like of the light source to be put out is displayed by a display (an LCD (Liquid Crystal Display), etc.), and a message saying "Turn off switch" may be displayed thereon.

Furthermore, an energy saving mode switch may be provided, to put out a set consisting of the light source 1a and the light source 1d or a set consisting of the light source 1b and the light source 1c when the switch is operated. That is, color nonuniformity occurs by simply stopping the supply of power to one of the light sources as an energy saving mode. However, the power consumption can be reduced without causing color nonuniformity by putting out both the paired light sources having canceling characteristics with respect to the color nonuniformity.

Although in the above-mentioned example, description was made of a four-light configuration, the present invention is also applicable to other multiple-light configurations, for example, a three-light configuration in which an illuminated state as shown in FIG. 3(a) occurs, and a six-light configuration in which an illuminated state as shown in FIG. 3(b) occurs. Although light emitted from each of the light sources is irradiated onto the integrator lens 4 in an optical path changing member (a mirror), it may be directly irradiated onto the integrator lens 4 without passing through the optical path changing member. Although the present invention is particularly suitable in the liquid crystal projector, one of the causes of color nonuniformity is an angle of incidence of each of the light sources on a dichroic mirror for color separation. A video projection system which will have such a cause is also applicable to a projection type video display device using no liquid crystal. Although illustrated as the liquid crystal light valve is a light transmission-type liquid crystal light valve, the present invention is also applicable to a case where a reflection-type liquid crystal light valve is used. Although it is detected that each of the light sources stops emitting light by monitoring the power consumed state of the light source, the present invention is not limited to the same. A configuration using a sensor such as a photodiode and other configurations may be used.

Embodiment 2

A liquid crystal projector according to an embodiment of the present invention will be described on the basis of FIGS. 4 to 6. The same optical system as that in the embodiment 1 is used, and the description thereof is simplified.

Figure 4:
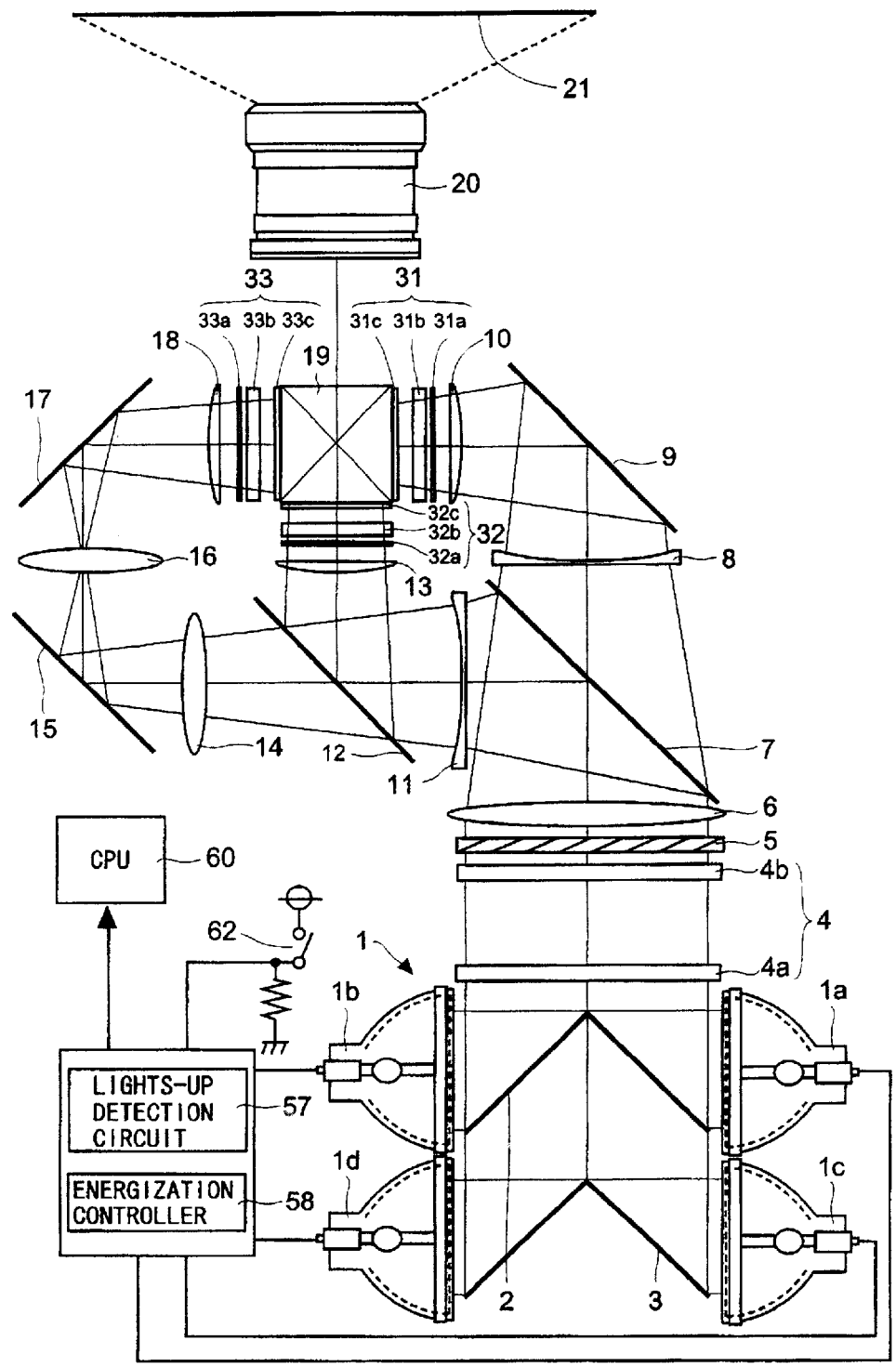
FIG. 4 is an illustration showing an optical system and a lighting system in a four-light and triple-plate liquid crystal projector in an embodiment 2 of the present invention.

FIG. 4 is a diagram showing an optical system and a lights-up system in a four-light and triple-plate liquid crystal projector according to an embodiment 2. An illuminating device 1 comprises two light sources 1a and 1b arranged opposite to each other and two light sources 1c and 1d similarly arranged opposite to each other, an optical path changing member 2 arranged between the light sources 1a and 1b, and an optical path changing member 3 arranged between the light sources 1c and 1d.

Light which has passed through an integrator lens 4 is introduced into a first dichroic mirror 7 after passing through a polarized light converter 5 and a condenser lens 6.

The polarized light converter 5 comprises a plurality of polarized light beam splitter arrays.

Light in a red wavelength band which has passed through the first dichroic mirror 7 is reflected on a reflecting mirror 9 through a concave lens 8 so that its optical path is changed. The red light which has been reflected on the reflecting mirror 9 is optically modulated by passing through a light transmission-type liquid crystal light valve for red 31 through a lens 10. On the other hand, light in a cyan wavelength band which has been reflected on the first dichroic mirror 7 is introduced into a second dichroic mirror 12 through a concave lens 11.

Light in a green wavelength band which has been reflected on the second dichroic mirror 12 is introduced into a light transmission-type liquid crystal light valve for green 32 through a lens 13 and is optically modulated by passing through the liquid crystal light valve 32. Light in a blue wavelength band which has passed through the second dichroic mirror 12 is introduced into a light transmission-type liquid crystal light valve for blue 33 through a relay lens 14, a total reflecting mirror 15, a relay lens 16, a reflecting mirror 17, and a relay lens 18, and is optically modulated by passing through the liquid crystal light valve 33.

Modulated light beams (video light beams in respective colors) which have been modulated by passing through the liquid crystal light bulbs 31, 32, and 33 are synthesized by a dichroic prism 19, to obtain color video light. The color video light is projected in enlarged fashion by a projection lens 20, and is projected and displayed on a screen 21.

A lights-up detection circuit 57 monitors the power consumed state of each of the light sources 1a, 1b, 1c, and 1d, for example. Power is not consumed when the light source stops emitting light by blowing its valve or breaking its wire, for example, or operating an energy saving selection switch 62, described later. Accordingly, the lights-up detection circuit 57 detects a state where each of the light sources is put on on the basis of the fact that power is not consumed, to transmit information related to lights-up/stop of light emission to a CPU 60, An energization controller 58 is so constructed as to individually supply power to the light sources 1a, 1b, 1c, and 1d. In the present embodiment, when an energy saving selection switch 62 is operated, the supply of power to one of the light sources (or one or two of the light sources depending on the energy saving level) is stopped to put out the light source.

Figure 5:
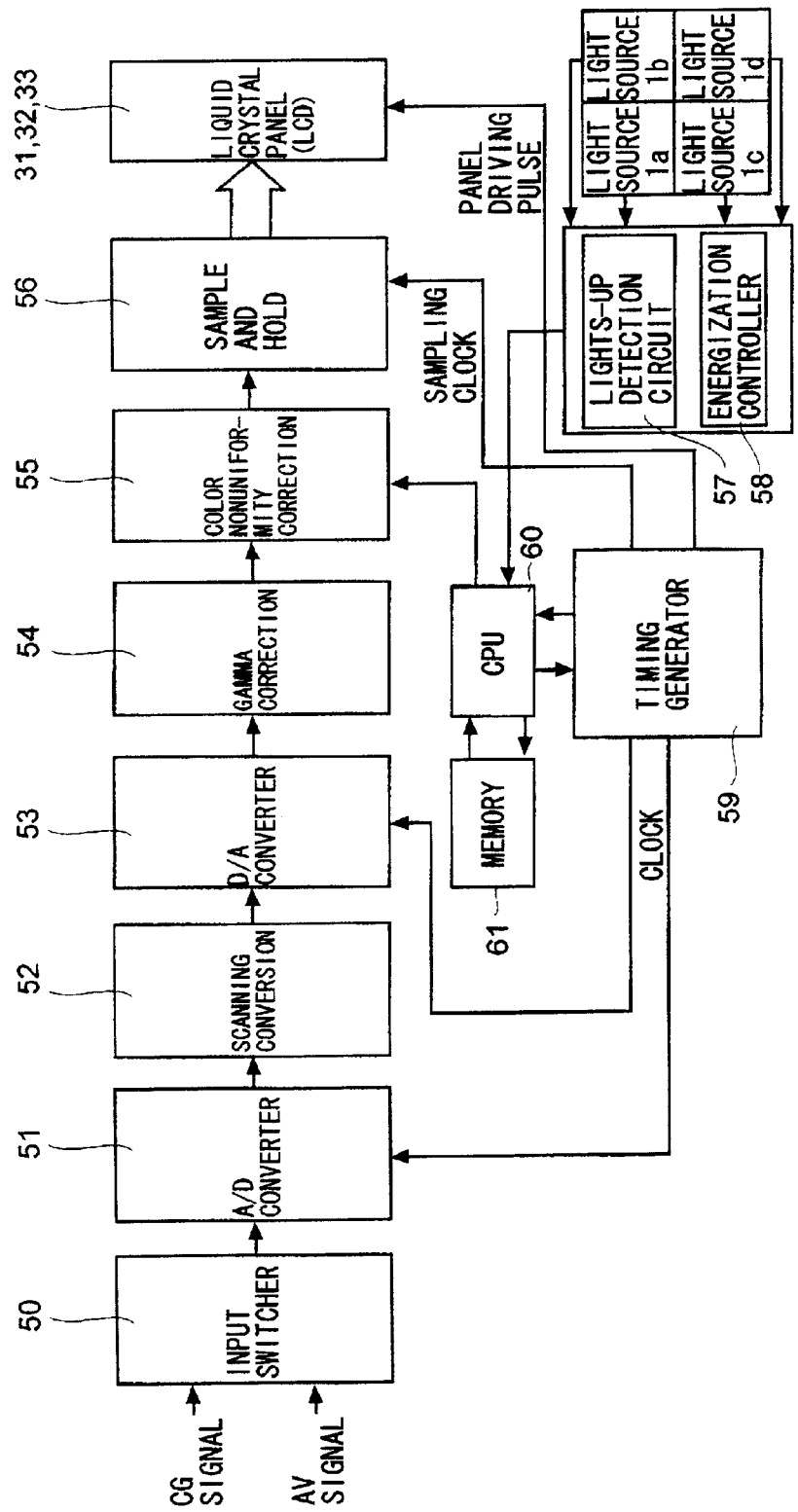
FIG. 5 is a block diagram showing a video signal processing system in the liquid crystal projector in the embodiment 2 of the present invention.
Figure 7:
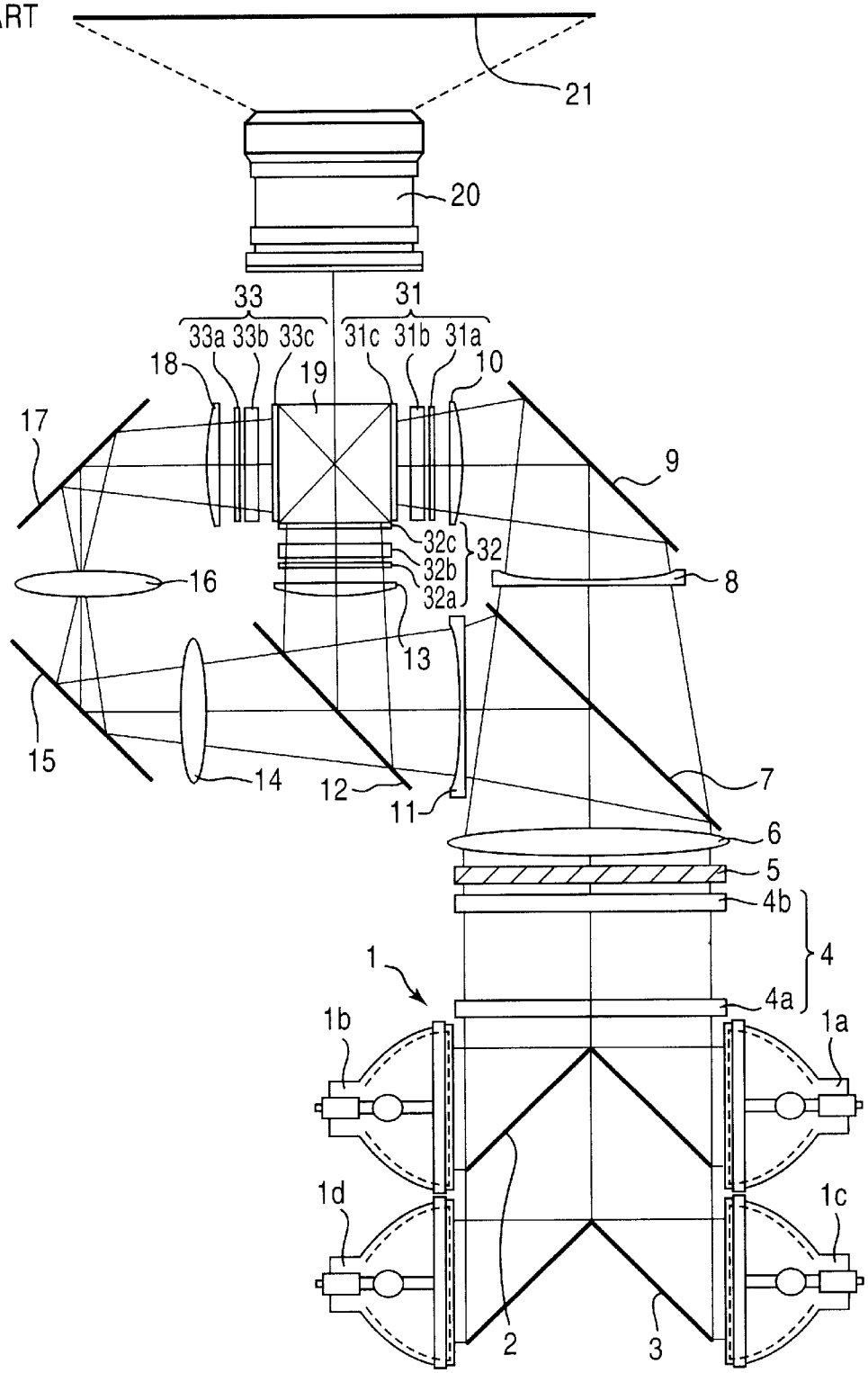
FIG. 7 is an illustration showing a conventional four-light and triple-plate liquid crystal projector having no lights-up control system.

A signal processing system will be then described on the basis of FIG. 5. Either a computer graphic signal (a CG signal) which is an analog signal or an audio visual signal (an AV signal) which is an analog signal is selected in an input switcher 50, and the selected analog video signal is fed to an A/D (Analog-to-Digital) converter 51. The analog video signal is converted into a digital video signal by the A/D converter 51 (actually, there are three A/D converters, to respectively perform analog-to-digital conversion with respect to R, G, and B colors). A scanning conversion circuit 52 receives the digital video signal, to perform digital processing such as frequency conversion. The digital video signal which has been processed by the scanning conversion circuit 52 is converted into an analog video signal in a D/A (Digital-to-Analog) converter 53. The analog video signal is subjected to gamma correction in a gamma correction circuit 54, and is further subjected to color nonuniformity correction in a color nonuniformity correction circuit 55, so that R, G, and B color signals are generated. The color signals are respectively time-division multiplexed in a sample and hold circuit 56 and fed to the liquid crystal panels 31, 32, and 33. A timing generator 59 supplies predetermined clocks to the A/D converter 51 and the D/A converter 53, supplies a sampling clock to the sample and hold circuit 56, and supplies panel driving pulses to the liquid crystal panels 31, 32, and 33.

A memory 61 stores correction data for canceling color nonuniformity which occurs in a case where any one or more of the light sources 1a, 1b, 1c, and 1d stop emitting light. That is, it has correction data in a case where the light source 1a stops emitting light, correction data in a case where the light source 1b stops emitting light, correction data in a case where the light source 1c stops emitting light, correction data in a case where the light source 1d stops emitting light, correction data in a case where the light source 1a and the light source 1b stop emitting light, correction data in a case where the light source 1a and the light source 1c stop emitting light, correction data in a case where the light source 1a and the light source 1d stop emitting light, correction data in a case where the light source 1b and the light source 1c stop emitting light, correction data in a case where the light source 1b and the light source 1d stop emitting light, correction data in a case where the light source 1c and the light source 1d stop emitting light, correction data in a case where the light source 1a, the light source 1b, and the light source 1c stop emitting light, correction data in a case where the light source 1a, the light source 1c, and the light source 1d stop emitting light, and correction data in a case where the light source 1b, the light source 1c, and the light source 1d stop emitting light.

The correction data employs a corrected value in a case where each of the light sources is put out in a stage where liquid crystal projectors are shipped, for example, a video signal is corrected such that the color nonuniformity is reduced in this state so that the color nonuniformity is reduced to a maximum. A method of acquiring a corrected value for each of the liquid crystal projectors but applying a corrected value obtained with respect to one of the liquid crystal projectors to the other liquid crystal projector as a typical value may be used. Further, only the correction data in a case where one of the light sources stops emitting light may be stored, to obtain, on the basis of the correction data in the case where one of the light sources stops emitting light, correction data by calculation with respect to the stop of the light emission of the plurality of light sources.

A CPU 60 carries out the following control as control according to the present invention in addition to the whole control in the liquid crystal projector. That is, the CPU 60 performs, when it receives a light emission stop signal of the light source from the lights-up detection circuit 57, processing for reading out the correction data which should be applied to a case where the light source stops emitting light from the memory 61 and feeding the read correction data to the color nonuniformity correction circuit 55.

The color nonuniformity correction circuit 55 corrects the video signal on the basis of the fed correction data. The nonuniformity correction circuit 55 is originally provided in view of the fact that the cell gap in the liquid crystal light valve is nonuniform in portions of a panel. When the cell gap is nonuniform in the respective portions of the panel, the same transmission rate is not obtained in respective pixels even by applying the same driving voltage to the pixels. Accordingly, single-color luminance nonuniformity appears as viewed with respect to each of the liquid crystal light bulbs, while color nonuniformity appears as viewed with respect to the synthesis of the three liquid crystal light bulbs. In order to correct the color nonuniformity, a screen is divided into a plurality of areas, the excess and deficiency of the luminance of the R, G, and B colors in each of the areas obtained by the division are measured, and correction data for changing a voltage of the video signal is stored in the memory 61 in order to compensate for the excess and deficiency. That is, one type of correction data is only originally stored in the memory 61.

One example of the one type of correction data is shown in FIG. 6(a). FIG. 6(a) illustrates for simplicity a case where 32 intermediate values out of values at 64 levels are given to all the areas obtained by the division, assuming that the cell gap is uniform in the respective portions of the panel. In this example, the screen is divided into 16 parts in the horizontal direction, and is divided into 13 parts in the vertical direction. When a corrected value is increased, a voltage of a signal in an area obtained by the division shall be raised, to heighten a color in the area. Such correction data shall be fed with respect to each of the R, G, and B colors.

If all the light sources are put on so that there is no color nonuniformity at all, the correction data shown in FIG. 6(a) shall be used as it is.

FIG. 6(b) illustrates an example of correction data (corresponding to one color) for correcting color nonuniformity which occurs because one of the light sources stops emitting light. In this example, when video in a certain color is projected on the screen, correction data in a case where the screen is dark at its upper left, and is darker toward its corner. The color nonuniformity correction circuit 55 corrects a signal to be fed to each of the liquid crystal light bulbs on the basis of such correction data, so that the color nonuniformity caused by the stop of light emission of the light source is canceled. A form having correction data for a measure to prevent color nonuniformity due to the difference in the cell gap added up can be also employed in addition to a form individually having correction data for a measure to prevent color nonuniformity due to the stop of light emission.

Furthermore, correction data for canceling a change in white color temperature due to the stop of light emission may be possessed in addition to the correction data for a measure to prevent color nonuniformity due to the stop of light emission, described above. An example of such correction data (in one color) is illustrated in FIG. 6(c). As such correction data, not a different value but the same value is given for each of the areas obtained by the division (consequently, a numerical value need not be given for each of the areas but may be given for the whole of the liquid crystal light bulb). For example, in a case where a certain light source stops emitting light, if green light is relatively lower than light in the other color, it is considered that a corrected value is 34, as shown in FIG. 6(c), in order to increase a signal voltage applied to the liquid crystal light valve for green 32, and a corrected value remains at 32 with respect to the other liquid crystal light bulbs 31 and 33.

When an energy saving selection switch 62 is operated, the supply of power to a predetermined light source is stopped to put out the light source. In such a case, a video signal is corrected, as described above, by detecting that the light source stops emitting light. That is, by merely putting out one or more of the light sources in order to save energy, color nonuniformity occurs. By performing the above-mentioned correction, however, the power consumption can be reduced without causing color nonuniformity and a change in white color temperature. Not the energy saving selection switch 62 but an ON/OFF switch for each of the light sources may be provided, to perform the same correction when the ON/OFF switch is operated.

Although in the above-mentioned example, description was made of the four-light configuration, the present invention is also applicable in other multiple-light configurations such as a three-light configuration, a five-light configuration, and a six-light configuration. Although the present invention is particularly suitable in the liquid crystal projector, one of the causes of color nonuniformity is an angle of incidence of each of the light sources on a dichroic mirror for color separation. A video projection system which will have such a cause is also applicable to a projection type video display device having no liquid crystal. Further, although illustrated as the liquid crystal light valve is a light transmission-type liquid crystal light valve, the present invention is also applicable to a case where a reflection type liquid crystal light valve is used. Although it is detected that each of the light sources stops emitting light by monitoring the power consumed state of the light source, the present invention is not limited to the same. A configuration using a sensor such as a photodiode and other configurations may be used.

As described in the foregoing, according to the projection type video display device in the present invention, the display of projected video can be continued in good color reproduction by preventing color nonuniformity from occurring and preventing a white color temperature from being changed in a case where one or more of light sources stop emitting light in a multiple-light configuration. Further, when an energy saving mode is selected by a switching operation, both of a pair of light sources having canceling characteristics with respect to color nonuniformity are put out, thereby making it possible to prevent the color nonuniformity from occurring. Further, it is possible to prevent the color nonuniformity from occurring and prevent the white color temperature from being changed while realizing the energy saving mode in a lights-out controller for putting out any one or more of the light sources.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type video display device comprising:
    an illumination optical system having a plurality of light sources for introducing light emitted from each of the light sources toward a respective partial area of an integrator lens to irradiate the whole area of the integrator lens;
    a color separation optical system for separating the light which has passed through the integrator lens into a plurality of color light beams;
    a light valve for modulating each of the color light beams;
    a projection optical system for projecting the light beams modulated by the light valve;
    a detector for detecting that at least one of said light sources stops emitting light; and
    a lights-out controller for putting out, when one of a pair of the light sources having canceling characteristics with respect to color nonuniformity stops emitting light, the other of the pair of the light sources.

2. A projection type video display device comprising:
    an illumination optical system having a plurality of light sources for introducing light emitted from each of the light sources toward a respective partial area of an integrator lens to irradiate the whole area of the integrator lens;
    a color separation optical system for separating the light which has passed through the integrator lens into a plurality of color light beams;
    a light valve for modulating each of the color light beams;
    a projection optical system for projecting the light beams modulated by the light valve;

a detector for detecting that at least one of said light sources stops emitting light; and reporting means for urging, when one of a pair of the light sources having canceling characteristics with respect to color nonuniformity stops emitting light, a user to put out the other of the pair of the light sources.

3. A projection type video display device comprising:

an illumination optical system having a plurality of light sources for introducing light emitted from each of the light sources toward a respective partial area of an integrator lens to irradiate the whole area of the integrator lens;

a color separation optical system for separating the light which has passed through the integrator lens into a plurality of color light beams;

a light valve for modulating each of the color light beams;

a projection optical system for projecting the light beams modulated by the light valve; and a switch for selecting the lights-up/lights-out of the light sources, pairs of the light sources having canceling characteristics with respect to color nonuniformity being put out/on when the switch is operated.

4. A projection type video display device comprising:

an illumination optical system having a plurality of light sources for introducing light emitted from each of the light sources toward a respective partial area of an integrator lens to irradiate the whole area of the integrator lens;

a color separation optical system for separating the light which has passed through the integrator lens into a plurality of color light beams;

a light valve for modulating each of the color light beams;

a projection optical system for projecting the light beams modulated by the light valve;

a correction data memory storing correction data previously prepared in order to cancel color nonuniformity which occurs when any one or more of the light sources stop emitting light;

a detector for detecting that at least one of said light sources stops emitting light; and a video signal corrector for reading out said correction data depending on the light source which stops emitting light and correcting a video signal.

5. A projection type video display device comprising:

an illumination optical system having a plurality of light sources for introducing light emitted from each of the light sources toward a respective partial area of an integrator lens to irradiate the whole area of the integrator lens;

a color separation optical system for separating the light which has passed through the integrator lens into a plurality of color light beams;

a light valve for modulating each of the color light beams;

a projection optical system for projecting the light beams modulated by the light valve;

a correction data memory storing correction data previously prepared in order to cancel a change in white color temperature which occurs when any one or more of the light sources stop emitting light;

a detector for detecting that at least one of said light sources stops emitting light; and a video signal corrector for reading out said correction data depending on the light source which stops emitting light and correcting a video signal.

6. The projection type video display device according to claim 4, further comprising a lights-out controller for putting out any one or more of the light sources, and so constructed as to perform correction for canceling the color nonuniformity or correction for canceling the change in white color temperature by said video signal corrector when said any one or more of the light sources is put out.

7. The projection type video display device according to claim 5, further comprising a lights-out controller for putting out any one or more of the light sources, and is so constructed as to perform correction for canceling the color nonuniformity or correction for canceling the change in white color temperature by said video signal corrector when said any one or more of the light sources is put out.

* * * * *